(12) United States Patent
Murnock et al.

(10) Patent No.: US 10,706,484 B1
(45) Date of Patent: Jul. 7, 2020

(54) METHODS, SYSTEMS, AND COMPUTER READABLE MEDIA FOR COMBINING POLLUTION SOURCE INFORMATION WITH GEOGRAPHIC AND/OR TEMPORAL INFORMATION FOR A LAND DISTURBING CONSTRUCTION SITE

(71) Applicant: Resource Environmental Solutions, LLC, Bellaire, TX (US)

(72) Inventors: Jason Michael Murnock, Boston, VA (US); Matthew Evan Whitacre, Winchester, VA (US)

(73) Assignee: Resource Environmental Solutions, LLC, Bellaire, TX (US)

( * ) Notice: Subject to any disclaimer, the term of this patent is extended or adjusted under 35 U.S.C. 154(b) by 0 days.

(21) Appl. No.: 15/440,887

(22) Filed: Feb. 23, 2017

Related U.S. Application Data

(60) Provisional application No. 62/350,484, filed on Jun. 15, 2016, provisional application No. 62/350,473, filed on Jun. 15, 2016.

(51) Int. Cl.
*G06Q 50/08* (2012.01)
*G06F 3/0482* (2013.01)
*G06F 3/0484* (2013.01)

(52) U.S. Cl.
CPC .......... *G06Q 50/08* (2013.01); *G06F 3/0482* (2013.01); *G06F 3/04847* (2013.01)

(58) Field of Classification Search
CPC .................. G06F 17/30241; G06Q 50/08
See application file for complete search history.

(56) References Cited

U.S. PATENT DOCUMENTS

| | | | |
|---|---|---|---|
| 5,831,876 A * | 11/1998 | Orr | G06T 17/05 703/6 |
| 7,945,852 B1 * | 5/2011 | Pilskalns | G06F 17/30241 715/230 |
| 8,510,429 B1 | 8/2013 | Thakur et al. | |
| 9,424,545 B1 * | 8/2016 | Lee | G06Q 10/063114 |
| 2003/0215110 A1 | 11/2003 | Rhoads et al. | |
| 2003/0230523 A1 | 12/2003 | Polizzotto et al. | |
| 2012/0297028 A1 * | 11/2012 | Das | G01D 21/02 709/217 |
| 2013/0326337 A1 | 12/2013 | Lehmann et al. | |
| 2014/0007017 A1 * | 1/2014 | Sternfeld | G06F 17/30241 715/848 |

(Continued)

OTHER PUBLICATIONS

Office Action corresponding to U.S. Appl. No. 15/440,853 dated Feb. 14, 2020.

(Continued)

*Primary Examiner* — Alvin H Tan
(74) *Attorney, Agent, or Firm* — Jenkins, Wilson, Taylor & Hunt, P.A.

(57) ABSTRACT

Methods, systems, and computer readable media for combining pollution source information with geographic and/or temporal information for a land disturbing construction site are disclosed. One method includes providing pollution source information. The method also includes providing geographic and/or temporal information regarding one or more activities on a construction site. The method further includes combining the pollution source information with the geographic information geographic and/or temporal information.

17 Claims, 17 Drawing Sheets

(56) References Cited

U.S. PATENT DOCUMENTS

2017/0091350 A1* 3/2017 Bauer ................ G06F 17/5095

OTHER PUBLICATIONS

Advisory Action corresponding to U.S. Appl. No. 15/440,853 dated Dec. 13, 2019.
Office Action corresponding to U.S. Appl. No. 15/440,853 dated Mar. 18, 2019.
Office Action corresponding to U.S. Appl. No. 15/440,853 dated Sep. 4, 2019.
Commonly-assigned, Co-pending U.S. Appl. No. 15/440,853 for "Methods, Systems, and Computer Readable Media for Combining Clean Water Act Compliance Data with Geographical Information for a Construction Site," (Unpublished, filed Feb. 23, 2017).

* cited by examiner

METHODS, SYSTEMS, AND COMPUTER READABLE MEDIA FOR COMBINING POLLUTION SOURCE INFORMATION WITH GEOGRAPHIC AND/OR TEMPORAL INFORMATION FOR A LAND DISTURBING CONSTRUCTION SITE

CROSS REFERENCE TO RELATED APPLICATIONS

The present application claims priority to and the benefit of U.S. Patent Application Ser. No. 62/350,473, filed Jun. 15, 2016 and U.S. Patent Application Ser. No. 62/350,484, filed Jun. 15, 2016, the disclosures of which are hereby incorporated herein by reference in their entireties.

TECHNICAL FIELD

The subject matter described herein relates to construction site and cleanup management. More specifically, the subject matter relates to methods, systems, and computer readable media for combining pollution source information with geographic and/or temporal information for a land disturbing construction site.

BACKGROUND

Section 402 of the Clean Water Act is entitled, the "National Pollutant Discharge Elimination System" (NPDES), and is the driver for environmental compliance pertaining to stormwater discharge permits for construction activities. Known as Construction General Permits (CGP), and varying slightly from (EPA-delegated) state to state (non-delegated states administer the EPA/Federal CGP guidelines verbatim), they require, among other activities and documentation, routine site inspections and documentation of results.

Site inspections focus on identifying any corrective actions necessary to minimize exposure of pollutants to stormwater runoff from the site. Minimization of stormwater pollution is achieved via the use of structural and non-structural Best Management Practices. Presently, software exists to assist permittees in the logging of corrective actions (description of correction, prescription of a fix, and the date noted), and the tracking of when the corrections are completed per item (date completed). The duration of time from date noted to date completed is regulated. However, paper records continued to be maintained on constructions sites for extended periods of time. What is needed, then, are computer-assisted approaches to reduce or even eliminate paper records on construction sites to bring the construction industry up to the modern day for compliance with the Clean Water Act.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

One method includes providing pollution source information. The method also includes providing geographic and/or temporal information regarding one or more activities on a construction site. The method further includes combining the pollution source information with the geographic information geographic and/or temporal information.

One system includes a module for providing pollution source information; a module for providing geographic and/or temporal information regarding one or more activities on a construction site; and a data combining and mapping module for combining the pollution source information with the geographic information and/or temporal information.

Accordingly, it is an object of the presently disclosed subject matter to provide a method and system for combining pollution source information with geographical and/or temporal information for a land-disturbing construction site.

An object of the presently disclosure having been stated hereinabove, and which is achieved in whole or in part by the presently disclosed subject matter, other objects will become evident as the description proceeds when taken in connection with the accompanying drawings as best described herein below.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 3 is a diagram illustrating a UI element for inputting data related to a geodatabase;

FIG. 4 is a diagram illustrating a UI element for inputting data related to a feature class;

FIG. 5 is a diagram illustrating a UI element for inputting predefined field data associated with a feature in a geodatabase;

DETAILED DESCRIPTION

Figure 1:
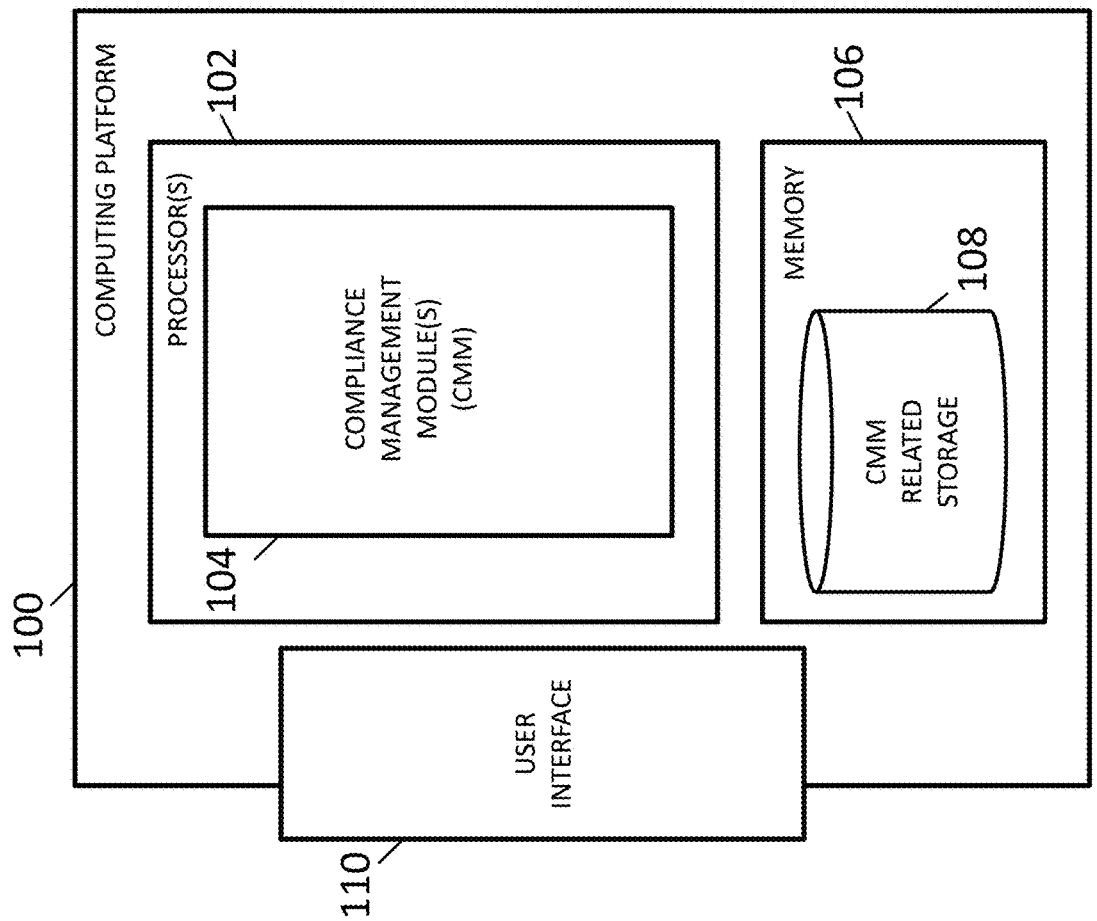
FIG. 1 is a block diagram illustrating an example computing platform for combining pollution source information with geographical and/or temporal information for a land-disturbing construction site.

The EPA requires that Land Disturbing Activities (LDA) operating under CGP track the location of potential pollution sources contained within the projects Limits of Disturbance (LOD) throughout the life of the project. Traditionally this has been accomplished through a series of paper maps and manual markups. The presently disclosed subject matter provides a unique Geographic Information System (GIS), and related methods and computer readable media, to apply a geospatial time component to feature services that will accurately represent the location of these sources over time. In some embodiments, the presently disclosed subject matter employs an arrangement of Environmental Systems Research Institute (ESRI) products and unique developer design and application. Representative geographic software components include ArcGIS 10.3 for Desktop, ArcGIS Online, and Web App Builder. These software components are commercially available from ESRI based in Redlands, Calif., United States of America.

In some embodiments, data points gathered in the field by the Geographic Solutions to Stormwater Management and Compliance (GEOSWM) web mapping application are directly linked to a sister reporting program that displays this geographic information in report form. In some embodiments, in the ArcGIS 10.3 for Desktop environment, unique geodatabases are built, site plans are assigned geographic and/or temporal information, and tiled and feature services are given unique properties. Output is published to be consumed by higher applications, such as the next two components.

The second software component is ESRI's online mapping environment: ArcGIS Online (AGOL). In this environment, feature services previously defined and published are consumed, and the base application design and attribute definitions are performed.

Finally, Web App Builder (WAB) is used to further design and structure the application and in some embodiments, will ultimately be the tool and interface the user will experience in the field. Representative embodiments of methods used in each of the abovementioned measures in building this GIS and the resulting GEOSWM web mapping application are described in the following sections.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

Referring now to the Figures, FIG. 1 is a block diagram illustrating an example computing platform 100 for combining pollution source information with geographical and/or temporal information for a land-disturbing construction site. Computing platform 100 may be any suitable entity (e.g., a mobile device or a server) configurable for providing pollution source information; providing geographic and/or temporal information regarding one or more activities on a construction site; and combining the pollution source information with the geographic and/or temporal information for the activities on the construction site. For example, computer platform 100 may include a memory 106 and a processor 102 for executing one or more modules 104 (e.g., an app or other software) for combining pollution source information with geographical and/or temporal information for a land-disturbing construction site. In this example, computer platform 100 may also include a user interface 110 for providing pollution source information, geographic information, and/or temporal information regarding one or more activities on a construction site. Continuing with this example, the app executing at computing platform 100 may use the recorded pollution source information, geographic information, and/or temporal information and may combine the pollution source information with the geographic and/or temporal information for the activities on the construction site.

Computing platform 100 may include processor(s) 102. Processor(s) 102 may represent any suitable entity or entities (e.g., hardware-based processor) for processing information and executing instructions or operations. Processor 102 may be any type of processor, such as a central processor unit (CPU), a microprocessor, a multi-core processor, and the like. Computing platform 100 may further include a memory 106 for storing information and instructions to be executed by processor 102.

In some embodiments, memory 106 can comprise one or more of random access memory (RAM), read only memory (ROM), static storage such as a magnetic or optical disk, or any other type of machine or non-transitory computer-readable medium. Computing platform 100 may further include a communication device (not shown), such as a network interface card or other communications interface, configured to provide communications access to various entities (e.g., other computing platforms). In some embodiments, memory 106 may be utilized to store one or more modules 104, or software therein, and a module related storage 108. One or more modules 104 may be any suitable entity (e.g., software executing on one or more processors) for performing one or more aspects associated with providing pollution source information; providing geographic and/or temporal information regarding one or more activities on a construction site; and combining the pollution source information with the geographic and/or temporal information for the activities on the construction site.

In some embodiments, module(s) 104 may include and/or utilize various applications and software components or output therefrom. For example, module(s) 104 may use application programming interfaces (APIs) or other interfaces to interact with different software or applications (e.g., ArcGIS, AGOL, and/or WAB) for performing one or more aspects described herein.

In some embodiments, computing platform 100 and/or module(s) 104 may be communicatively coupled to a user interface 110. User interface 110 may be any interface for providing information (e.g., output) to a user and/or for receiving information (e.g., input) from a user. In some embodiments, user interface 110 may include a graphical user interface (GUI) for receiving input from a user and/or a display screen for displaying maps to a user. For example, module(s) 104 may include functionality for combining the pollution source information with the geographic and/or temporal information for the activities on the construction site and displaying this information via user interface 110.

Memory 106 may be any suitable entity (e.g., a non-transitory computer readable medium) for storing information. Memory 106 may include a module-related storage 108. Module-related storage 108 may be any suitable entity (e.g., a database embodied or stored in computer readable media) storing user data, recorded responses, and/or predetermined information. In some embodiments, module-related storage 108 may be accessible by one or more modules 104 of computing platform 100 and may be located externally to or integrated with module(s) 104 and/or computing platform 100. For example, module-related storage 108 may be stored at a server located remotely from a mobile device containing module(s) 104 but still accessible by module(s) 104. In another example, module-related storage 108 may be located at distributed or separated across multiple nodes. It will be appreciated that the above described modules are for illustrative purposes and that features or portions of features described herein may be performed by different and/or additional modules, components, or nodes. For example, aspects of providing pollution source information; providing geographic and/or temporal information regarding one or more activities on a construction site; and combining the pollution source information with the geographic and/or temporal information for the activities on the construction site described herein may be performed by one or more modules 104, computing platform 100, and/or other modules or nodes.

Figure 2:
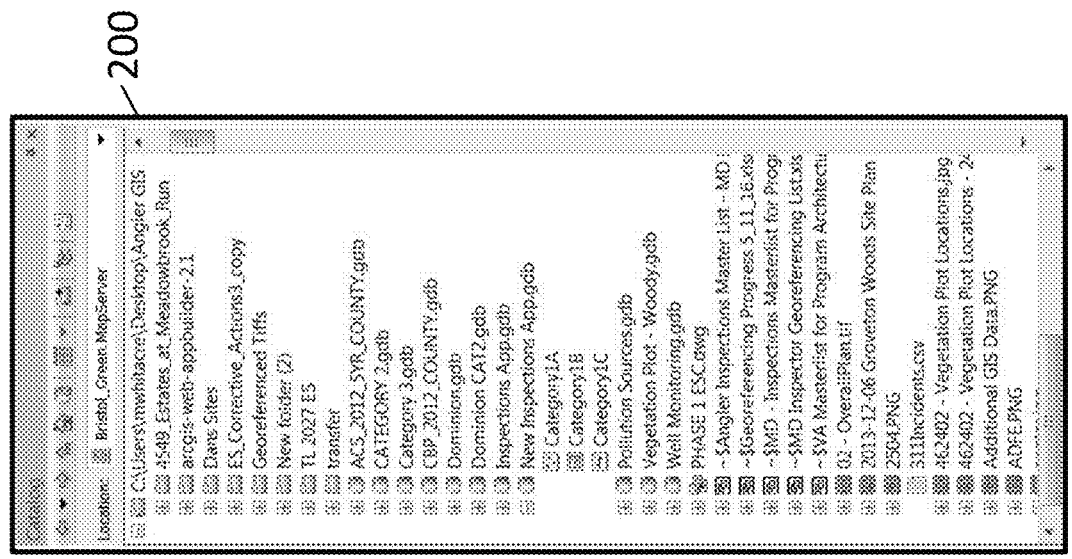
FIG. 2 is a diagram illustrating a user interface (UI) element for selecting geodatabases or other data.

FIG. 2 is a diagram illustrating a user interface (UI) element 200 for selecting geodatabases or other data. In some embodiments, UI element 200 may represent a tree view or panel for selecting and/or managing data associated with one or more geodatabases. For example, UI element 200 may be a part of a GUI associated with module(s) 104 and/or a related geodatabase builder application or geodatabase manager (e.g., ArcCatalog). In this example, UI element 200 or user interface 110 may be usable for viewing, modifying, deleting, or managing various GIS data, including geodatabases or data files therein.

In some embodiments, module(s) 104 or related entity may provide or use application software (e.g., logic executing by processor(s) 102) for interacting with geographic data in various files and formats and from various sources. Example geographic data may accessed, utilized, or stored using shapefiles, computer-aided drafting (CAD) files or data, triangulated irregular networks (TINs), grids, images, Geography Markup Language (GML) files, Extensible Markup Language (XML) files, and other GIS data sources.

In some embodiments, a geodatabase may be one or more data structures or data containers for storing datasets associated with a geographical location. For example, a geodatabase may be a database of geographic features and/or related information. In some embodiments, a geodatabase (e.g., an ArcGIS geodatabase) may include a collection of various geographic datasets and may be stored in a common file system folder, a Microsoft Access database, or a relational database management system (DBMS), e.g., Oracle, Microsoft SQL Server, etc. In some embodiments, a geodatabase may be generated, modified, and/or accessed via module(s) 104 or associated entities, e.g., a geodatabase builder or related software (e.g., a GIS), and/or a DBMS using an SQL programming language.

In some embodiments, a geodatabase may use or include a suitable information model for representing and/or managing geographic information, e.g., physical dimensions, geographic features, topology data, and/or other data. For example, a comprehensive information model may be implemented as a series of data structures (e.g., data tables) containing feature classes (e.g., similar collections of features with a common spatial representation and set of attributes stored in a data structure), raster datasets (e.g., datasets representing a grid of cells (e.g., pixels) where each cell contains a value representing data), and attributes. In some embodiments, a geodatabase may store and/or interact with GIS data objects that can provide various features, e.g., additional GIS behavior; rules for handling spatial integrity; and tools for working with various geographic or GIS information.

In some embodiments, a geodatabase may use or include a suitable transaction model for managing GIS workflow. For example, a transaction model may include an editing history, versioning, and/or checking in or checking out portions of a geodatabase for editing. In this example, the transaction model may represent or store transactions (e.g., actions or groups of actions) associated with using and/or interacting with a geodatabase It will be appreciated that FIG. 2 is for illustrative purposes and that additional and/or different UI elements and content than that depicted in FIG. 2 may be usable for aspects described herein.

Figure 3:
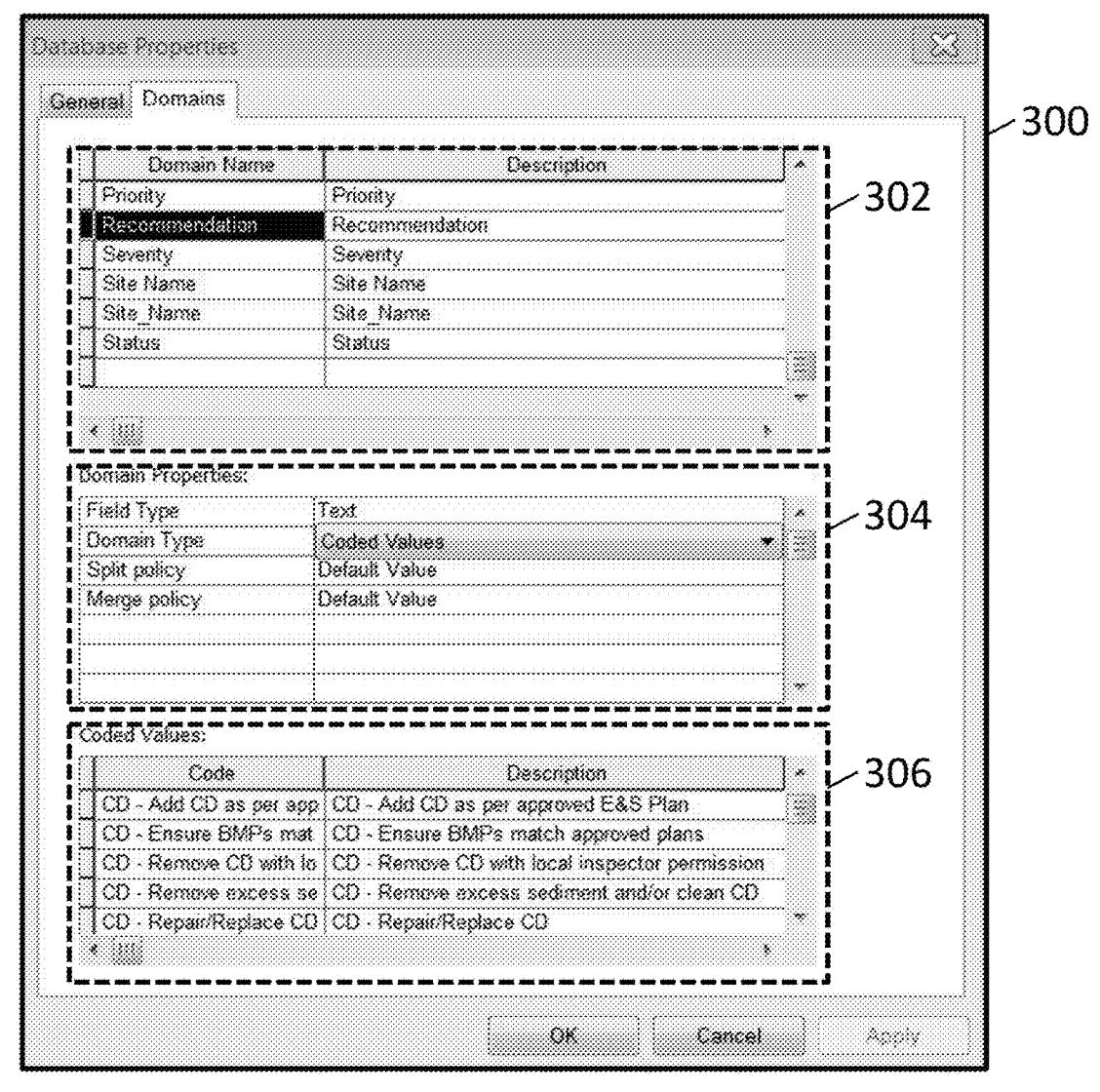

FIG. 3 is a diagram illustrating a UI element 300 for inputting data related to a geodatabase. UI element 300 may represent a UI container or window for changing or viewing various properties associated with a geodatabase, e.g., domain names and descriptions, domain properties, and coded values. For example, UI element 300 may be a part of a GUI associated with module(s) 104 and/or a related geodatabase builder application or geodatabase manager. In this example, UI element 300 or user interface 110 may be usable for viewing, modifying, deleting, or managing various properties that affect types or kinds of information stored.

A domain may represent rules or logic applicable to particular data (e.g., a data field) in a geodatabase or a dataset. For example, a domain may enforce data integrity by restricting the values that can be entered in a related field. In some embodiments, domains may be defined for a geodatabase and may be applied to various types of datasets, e.g., multiple feature classes, tables, or subtypes.

UI element 302 or user interface 110 may be usable for allowing information about domains to be viewed, modified, added, or deleted. For example, UI element 302 or user interface 110 may allow a user to input a domain owner, a domain name, and a domain description. In this example, each row in UI element 302 may represent a domain. In some embodiments, a domain owner may be a user or a user group that can access or modify the domain. In some embodiments, a domain name may be an identifier (e.g., globally or locally unique identifier) usable for identifying a domain. In some embodiments, a domain description may include metadata or other information for describing the domain.

UI element 304 or user interface 110 may be usable for allowing domain properties to be viewed, modified, added, or deleted. In this example, each row in UI element 304 may represent a field type, such as a domain type, a split policy, and a merge policy. In some embodiments, a domain type may be usable for indicating whether field data is using coded values or a range of values. In some embodiments, a split policy may determine how data is to be handled if a feature is split (e.g., creating two features from one). Example split policies may include a default value policy (e.g., where attributes of resulting features take on default values for the attributes based on a given feature class or subtype); a duplicate policy (e.g., where attributes of resulting features take on the attribute values of the original feature); and a geometry ratio policy (e.g., attributes of resulting features are a ratio of the original feature's attribute values based on the ratio in which the original geometry is divided to create the resulting features). In some embodiments, a domain name may be an identifier (e.g., globally or locally unique identifier) usable for identifying a domain. In some embodiments, a merge policy may determine how data is to be handled if features are merged (e.g., creating one feature from two). Example merge policies may include a default value policy (e.g., where attributes of a resulting feature take on default values for the attributes based on a given feature class or subtype); a sum values policy (e.g., where attributes of a resulting feature take on the summed attribute values of the original features); and a geometry weighted policy (e.g., attributes of a resulting feature are weighted averages of attributes values from the original features).

In some embodiments, properties of a domain may be hierarchical and/or may be associated with an inheritance mechanism. For example, a domain may be associated with a domain type. In this example, a domain type may indicate that values for a related field must be a coded value from among a set of coded values. In another example, a domain type may indicate that values for a related field must be a value from among a range of values.

UI element 306 or user interface 110 may be usable for allowing coded values to be viewed, modified, added, or deleted. For example, UI element 306 or user interface 110 may allow a user to input a code and a code description. In this example, each row in UI element 306 may represent a coded value. In some embodiments, a code may be an identifier (e.g., globally or locally unique identifier) usable for identifying a coded value. In some embodiments, a code description may include metadata or other information for describing the coded value.

In some embodiments, geodatabases may be designed to include or store ESC and NPDES related terms for fields associated with pollution source features. In some embodiments, these terms may be added to relevant feature classes within a geodatabase by first formulating these terms and then populating them within the file geodatabase domains and further into each domain's coded values.

It will be appreciated that FIG. 3 is for illustrative purposes and that additional and/or different UI elements and content than that depicted in FIG. 3 may be usable for aspects described herein.

Figure 4:
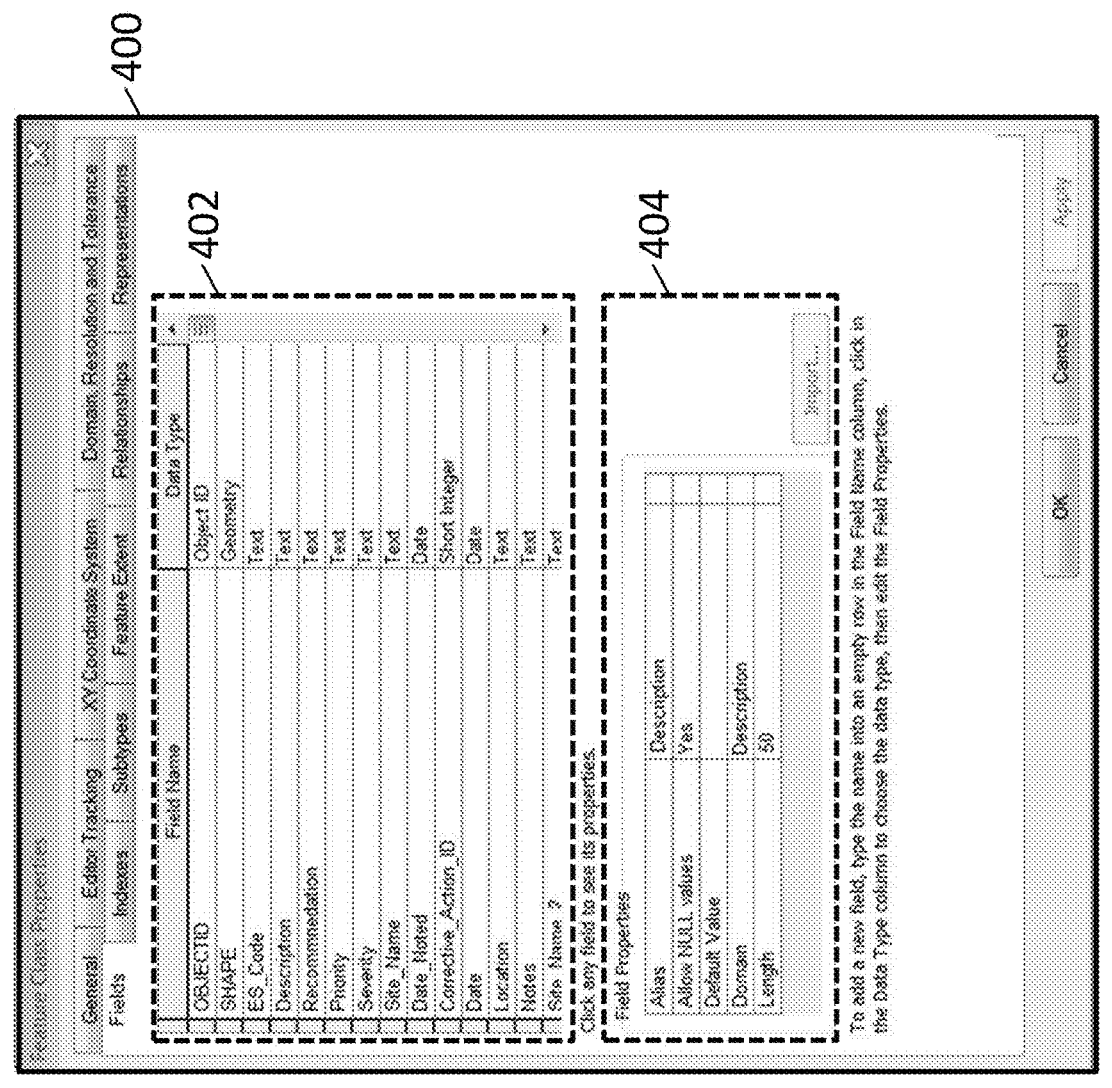

FIG. 4 is a diagram illustrating a UI element 400 for inputting data related to a feature class. UI element 400 may represent a UI container or window for changing or viewing various properties associated with a feature class, e.g., field data and field properties. For example, UI element 400 may be a part of a GUI associated with module(s) 104 and/or a related geodatabase builder application or geodatabase manager. In this example, UI element 400 or user interface 110 may be usable for viewing, modifying, deleting, or managing various properties that affect types or kinds of information stored for a particular feature class.

A feature class may represent a data construct for storing data related to a feature (e.g., a geographic feature). For example, a feature class may be represented as a dataset (e.g., a data table). In this example, the dataset may include data fields for storing a geometric shape as well as descriptive attributes associated with features of this feature class. In some embodiments, a feature class may represent features that have similar attributes and spatial representation, e.g., points, lines, polygons, or text. For example, boundaries may be represented by a feature class that uses lines for spatial representation. In another example, map text (e.g., feature names, feature dimensions, etc.) may be represented by a feature class that uses text for spatial representation. In another example, pollution areas or pollution sources may be represented by a feature class that uses polygons for spatial representation. In another example, global positioning system (GPS) data may be represented by a feature class that uses points for spatial representation.

UI element 402 or user interface 110 may be usable for allowing attributes associated with a feature class to be viewed, modified, added, or deleted. For example, UI element 402 or user interface 110 may allow a user to input a field name and a data type. In this example, each row in UI element 302 may represent a data field or feature attribute. In some embodiments, a field name may be an identifier (e.g., globally or locally unique identifier) usable for identifying a field. In some embodiments, a data type may indicate a type of information stored in a related data field, e.g., object ID, geometry (e.g., physical coordinates), text, short integer, date, etc.

In some embodiments, a feature class may be generated for storing data related to pollution sources. For example, a pollution source feature class may include an ES code indicating what type of pollution source, a text description of the pollution source, a recommendation for cleanup or corrective action(s), a priority value indicating priority for cleanup (e.g., relative to other pollution sources associated with a construction site or map), a severity value indicating an extent of the pollution (e.g., a number from 1 to 10), a site name, a date when pollution source is noted or identified, a corrective action ID for identifying a corrective action, a current date, a location or a spatial component representing a location of the pollution source (e.g., within a mapped area), notes associated with the pollution source or a related corrective action, a second site name for further identifying the pollution source or an area therein, a status related to cleanup, a date indicated when cleanup was completed (e.g., when a corrective action was completed), and/or an assigned trade value associated with cleaning up the pollution source, e.g., which may be sold or exchanged in a pollution reduction credits exchange.

In some embodiments, multiple feature classes may be generated for storing data related to different pollution sources. For example, pollution source may involve different geometric characteristics than others depending on the nature of the source and may be represented by a different feature class. In this example, one pollution source feature class may spatially represent a pollution source as a point, another pollution source feature class may spatially represent a pollution source as a line, and another pollution source feature class may spatially represent a pollution source as a polygon.

UI element 404 or user interface 110 may be usable for allowing field properties to be viewed, modified, added, or deleted. In this example, each row in UI element 304 may represent aliases or attributes for a selected field, such as "allow null values", "default value", "domain", and "length". In some embodiments, an "allow null values" attribute may indicate whether a selected field can store a null or empty value and the attribute may be represented by a Boolean ("Yes"/"No") value. In some embodiments, a "default value" attribute may indicate a default value (e.g., if no value is provided by a user) for a selected field and the attribute may be represented by text, numbers, or other relevant data. In some embodiments, a "domain" attribute may indicate a particular domain associated with a selected field and the attribute may be represented by a domain name or identifier. In some embodiments, a "length" attribute may indicate a maximum data length allowed for a selected field and the attribute may be represented by a number, e.g., a positive integer.

It will be appreciated that FIG. 4 is for illustrative purposes and that additional and/or different UI elements and content than that depicted in FIG. 4 may be usable for aspects described herein.

Figure 5:
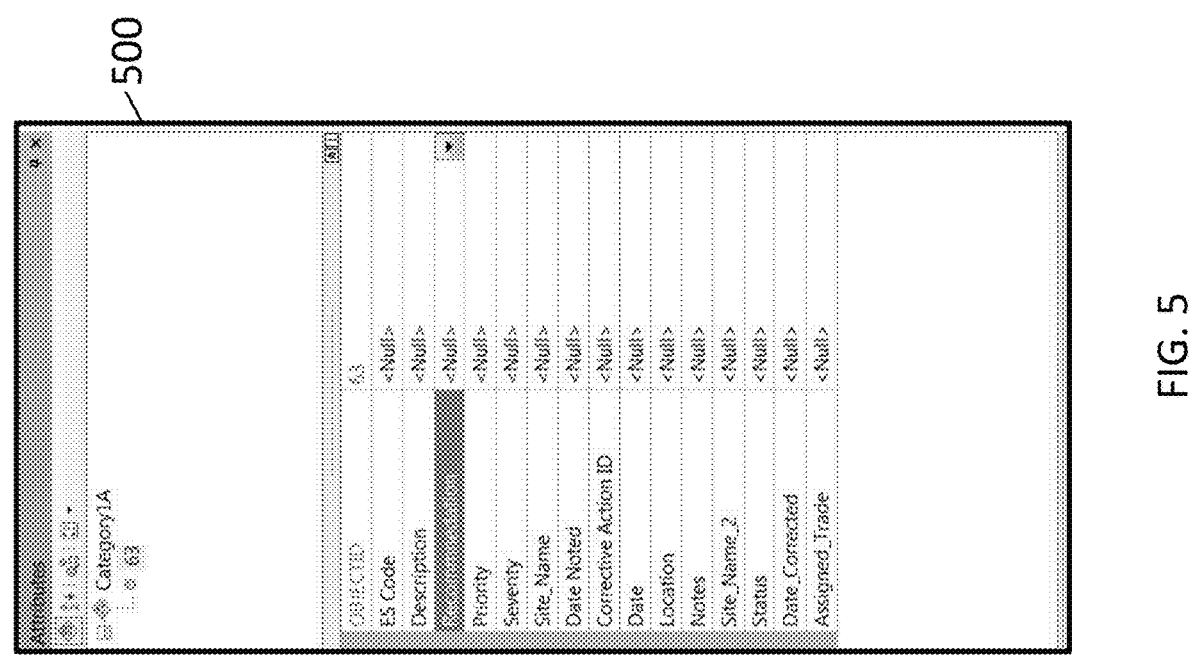

FIG. 5 is a diagram illustrating a UI element 500 for inputting predefined field data associated with a feature (e.g., a pollution source, a landform, a building, etc.) in a geodatabase. UI element 500 may represent a UI container or window for changing or viewing various fields associated with a feature. For example, UI element 500 may be a part of a GUI associated with module(s) 104 and/or a related geodatabase builder application or geodatabase manager. In this example, UI element 500 or user interface 110 may be usable for viewing, modifying, deleting, or managing various properties for a particular feature.

In some embodiments, a pollution source feature may be selected for data input. For example, as depicted in FIG. 5, a pollution source feature associated with this feature class may include an ES code, a text description, a cleanup recommendation, temporal data, and/or other attributes. In some embodiments, UI element 500 may provide various UI components such that a user can input field data associated with the feature. For example, domain values (e.g., coded values) associated with a field may be selectable via a dropdown list. In another example, e.g., if no domain or data restriction is associated with a field, a user may input any value, text, or data.

It will be appreciated that FIG. 5 is for illustrative purposes and that additional and/or different UI elements and content than that depicted in FIG. 5 may be usable for aspects described herein.

Figure 6:
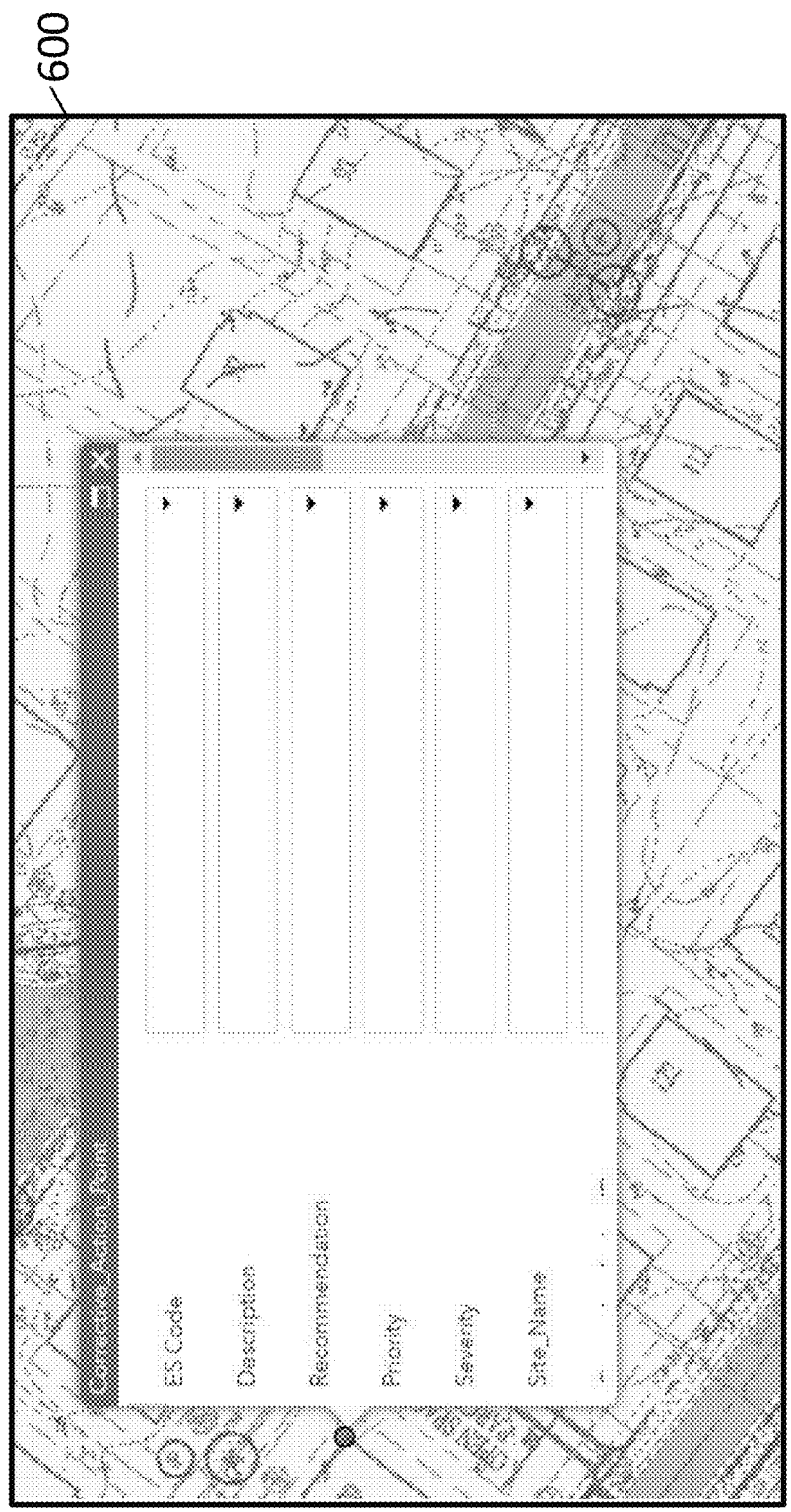
FIG. 6 is a diagram illustrating a UI element for viewing and/or modifying field data associated with a feature in a geodatabase.

FIG. 6 is a diagram illustrating a UI element 600 for viewing and/or modifying field data associated with a feature in a geodatabase. UI element 600 may be a part of a GUI associated with module(s) 104 and/or a GEOSWM web mapping application. In this example, UI element 600 or user interface 110 may be usable for adding, deleting, or modifying a pollution source or a corrective action point.

In some embodiments, a user may select an area or spot in a map displayed in user interface 110. In such embodiments, after identifying a corrective action point, UI element 600 may be displayed to allow a user to input information about the corrective action point.

It will be appreciated that FIG. 6 is for illustrative purposes and that additional and/or different UI elements and content than that depicted in FIG. 6 may be usable for aspects described herein.

Figure 7:
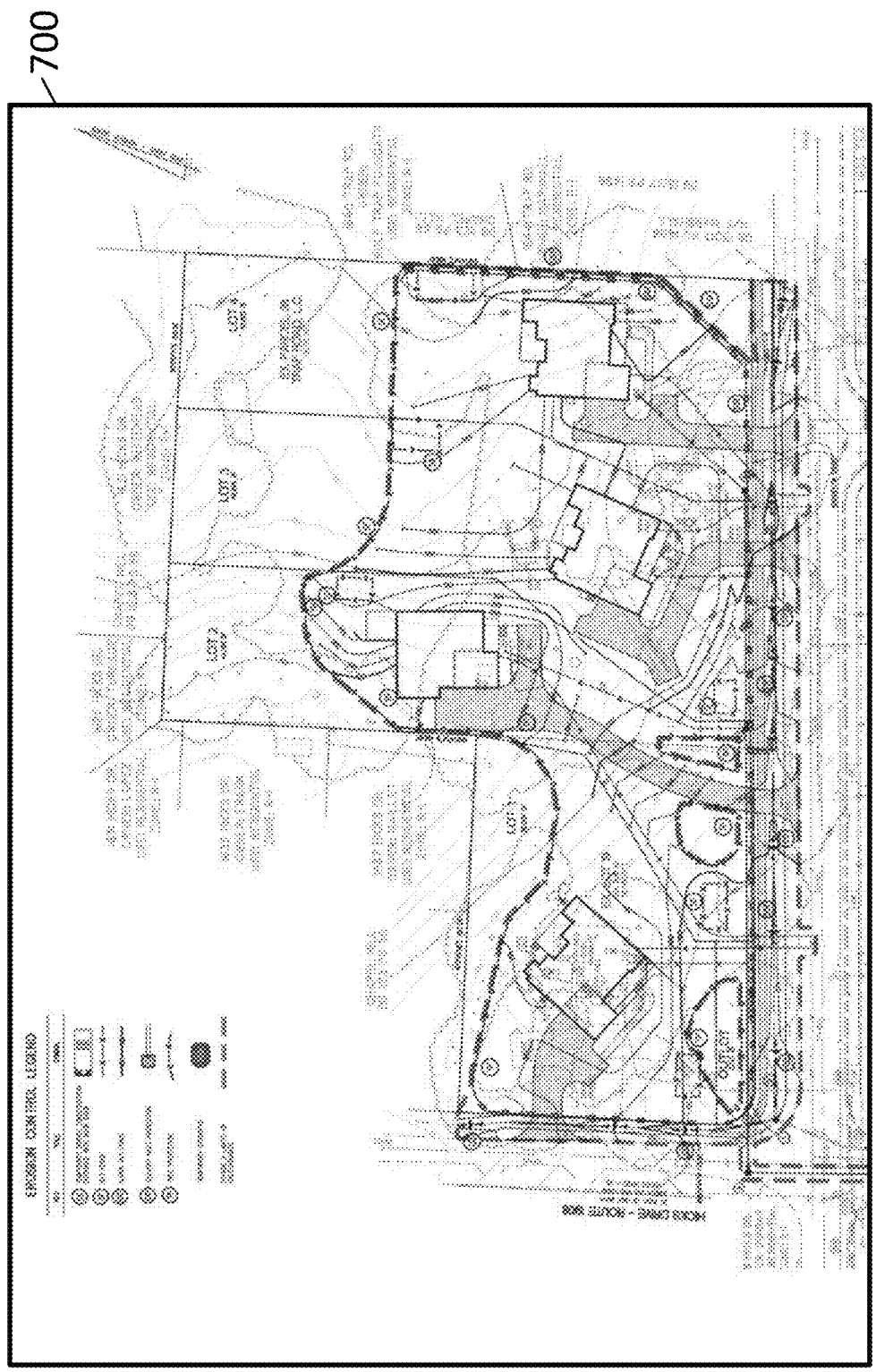
FIG. 7 is a diagram illustrating an example construction site plan.

FIG. 7 is a diagram 700 illustrating an example construction site plan. The example construction site plan may indicate a construction site along with features, boundaries, and various ESC related areas of interest, e.g., pollution sources or corrective action points. In some embodiments, a particular construction site may be dependent on multiple parameters (e.g., buildable area, site constraints, etc.) and may include the "limits of disturbance" for a pollution source or a corrective action point.

Figure 8:
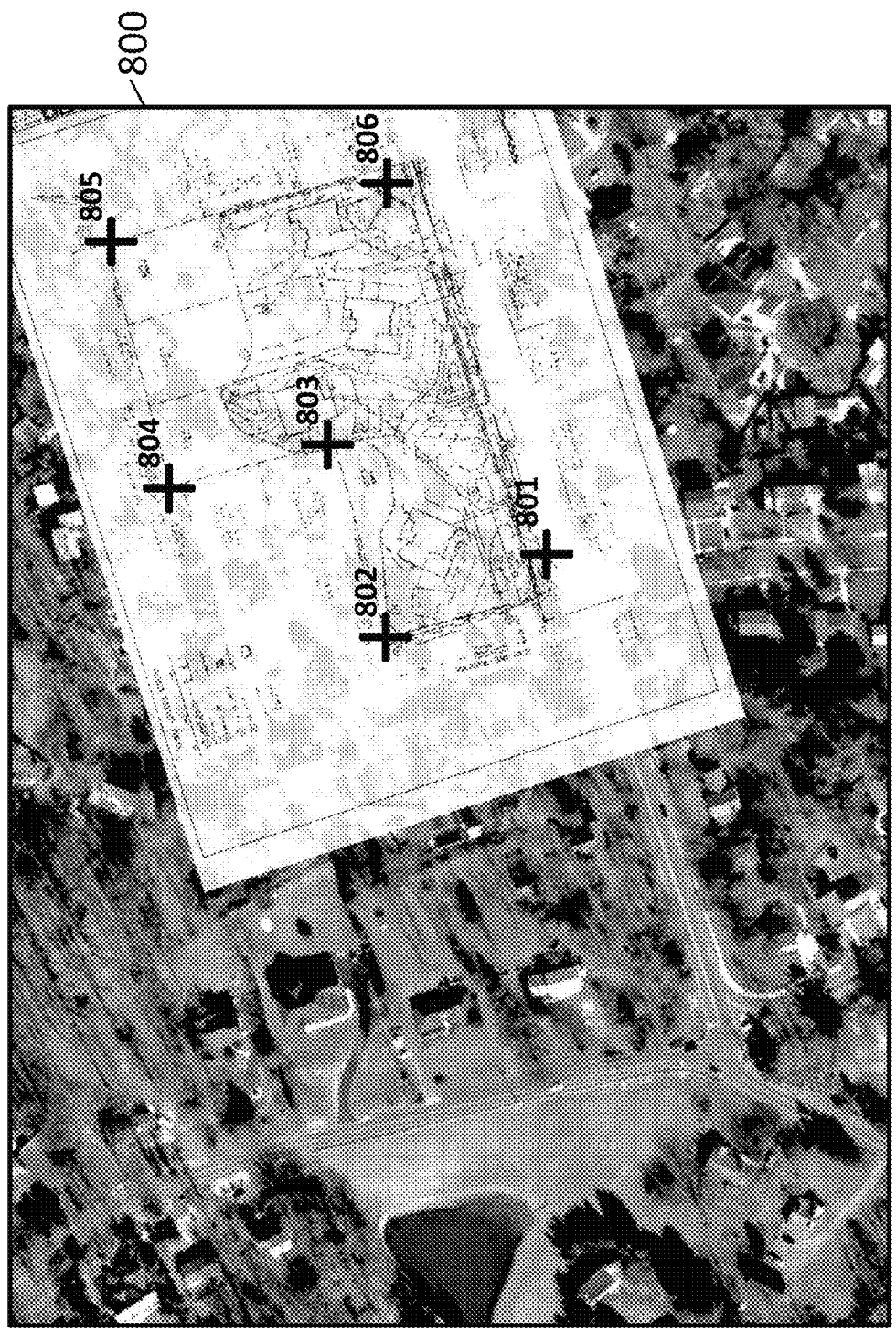
FIG. 8 is a diagram illustrating georeferencing an example construction site plan.

FIG. 8 is a diagram 800 illustrating georeferencing an example construction site plan using points 801-806, depicted as "+" signs. In some embodiments, in order to accurately represent site plans via module(s) 104 and/or a GEOSWM web mapping application, a site plan may be given spatial properties based on a process known as 15 georeferencing. For example, georeferencing may involve using known or derivable location information of two or more points (e.g., GPS coordinates) on a site plan and overlaying the site plan on a base map (e.g., a satellite image) where the two or more points on a site plan are matched with corresponding points on the base map.

In some embodiments, points used for georeferencing may include locations or markers that are discernible. For example, points 801-806 may indicate locations or markers where GPS coordinates are known or discernible on a construction site plan. Examples of viable georeferencing markers include corners of existing structures, street corners, light poles, driveway corners, etc.

In some embodiments, prior to matching points of the site plan with points on a base map, a site plan and/or a base map may need to be formatted or converted to an acceptable file format, e.g., a .tif file format, a .png file format, and/or other file formats.

In some embodiments, a site plan and/or a base map may also need to be modified or manipulated prior to matching points of the site plan with points on a base map. For example, a site plan may be enlarged or a related image resolution may be altered so as to correspond with a base map. In another example, a base map may be enlarged or a related image resolution may be altered so as to correspond with a site plan.

In some embodiments, module(s) 104 and/or a related application may utilize other techniques for assigning spatial properties to a site plan. Example techniques include obtaining at least one of GPS coordinates, a longitude, a latitude, an altitude, a street address, and a relationship to a known fixed position.

It will be appreciated that FIG. 8 is for illustrative purposes and that additional and/or different UI elements and content than that depicted in FIG. 8 may be usable for aspects described herein.

Figure 9:
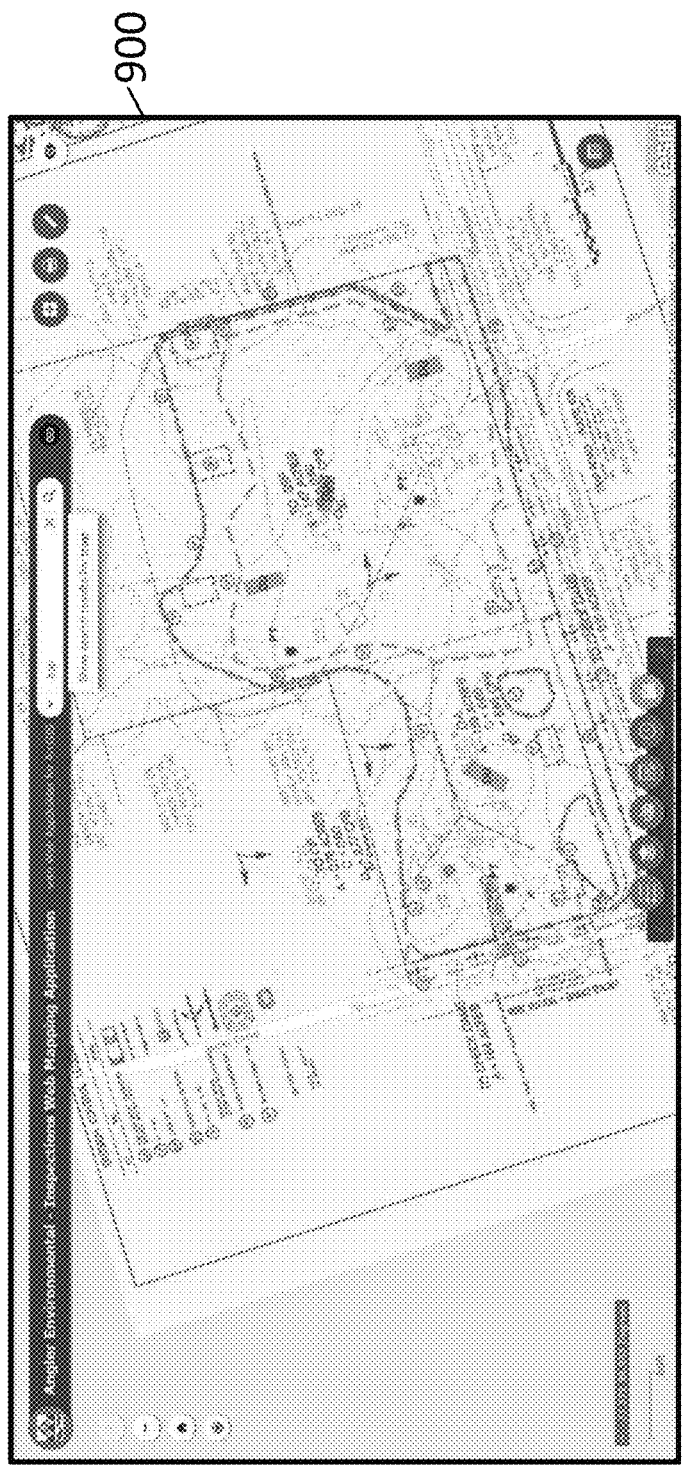
FIG. 9 is a diagram illustrating a UI element for displaying an example construction site plan.

FIG. 9 is a diagram illustrating a UI element 900 for displaying an example construction site plan. UI element 900 may be a part of a GUI associated with module(s) 104 and/or a GEOSWM web mapping application. In this example, UI element 900 or user interface 110 may be usable for adding, deleting, or modifying a pollution source or a corrective action point on a construction site plan. In some embodiments, a user may select or mark an area or spot on a map displayed in UI element 900 or user interface 110.

It will be appreciated that FIG. 9 is for illustrative purposes and that additional and/or different UI elements and content than that depicted in FIG. 9 may be usable for aspects described herein.

Figure 10:
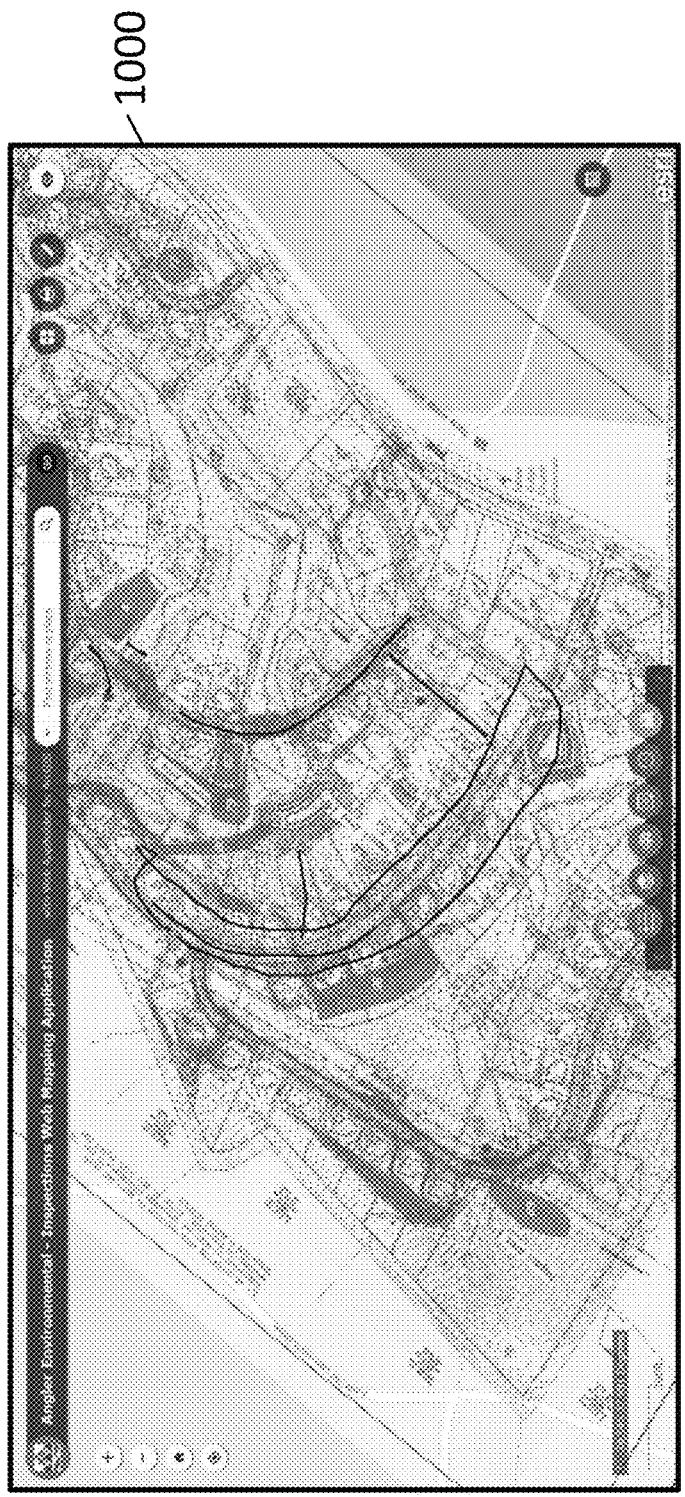
FIG. 10 is a diagram illustrating a UI element for modifying an example construction erosion and sediment control plan to depict areas of interest.

FIG. 10 is a diagram illustrating a UI element 1000 for modifying an example construction site plan to depict areas of interest. UI element 1000 may be a part of a GUI associated with module(s) 104 and/or a GEOSWM web mapping application. In this example, UI element 1000 or user interface 110 may be usable for adding, deleting, or modifying a pollution source or a corrective action point on a construction site plan. In some embodiments, a user may select or mark an area or spot on a map displayed in UI element 1000 or user interface 110.

In some embodiments, areas of interest may be labeled and/or marked for indicating various pollution sources and/or corrective actions. For example, some pollution sources may be marked as a polygon (e.g., a filled-in shape) and some other pollution sources may be marked as a line.

It will be appreciated that FIG. 10 is for illustrative purposes and that additional and/or different UI elements and content than that depicted in FIG. 10 may be usable for aspects described herein.

Figure 11:
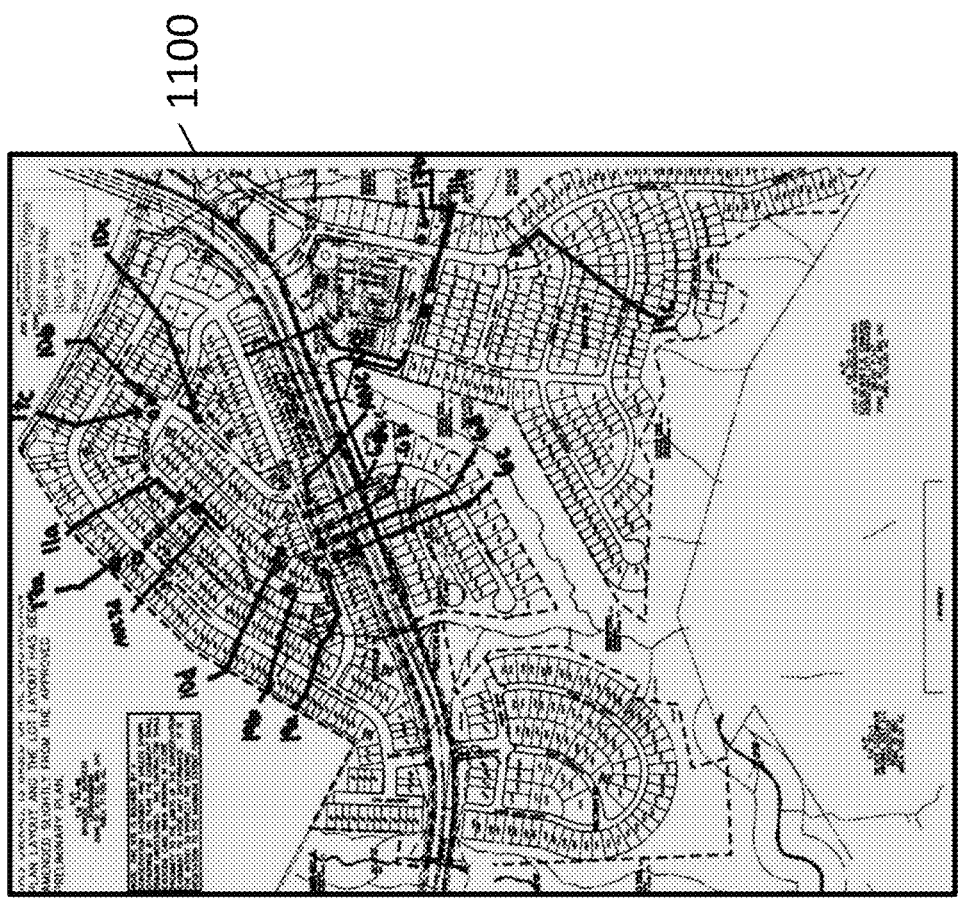
FIG. 11 depicts a paper construction site plan with manual markings indicating corrective actions.

FIG. 11 depicts a paper construction site plan 1100 with manual markings indicating corrective actions. One current method for tracking corrective actions on a construction site is to mark or label areas of interests (e.g., pollution sources or corrective actions) on a paper construction site plan. In contrast to aspects described herein, a paper construction site plan with manual markings facilitates imprecise record keeping. Moreover, a paper construction site plan may be stored in a stormwater pollution prevention plan (SWPPP) binder on a construction site and, as such, the marked construction site plan may be exposed to the elements and/or debris, thereby degrading and/or potentially corrupting the data indicated by the markings.

Figure 12:
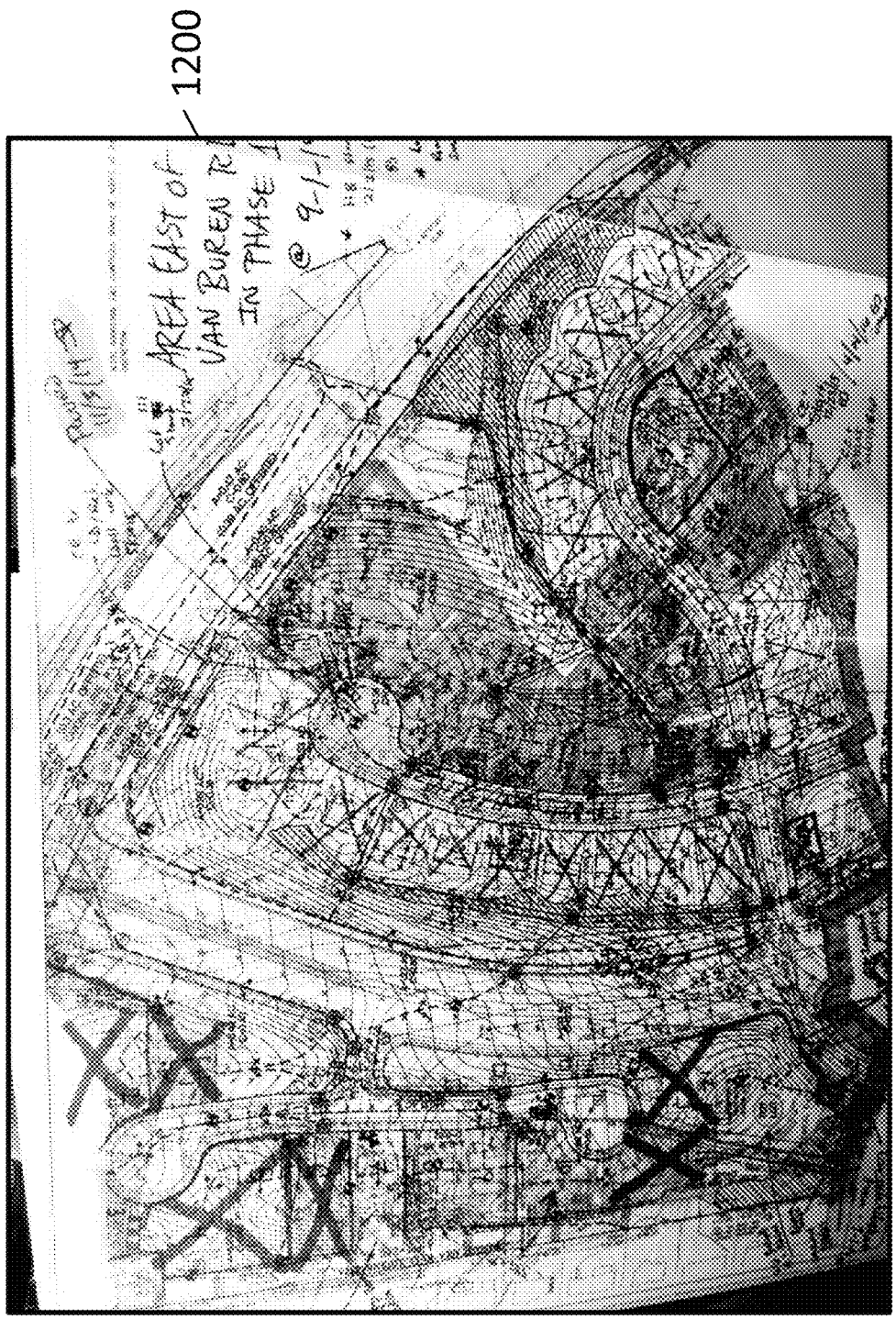
FIG. 12 depicts a paper construction site plan with manual markings for tracking land disturbances.

FIG. 12 depicts a paper construction site plan 1200 with manual markings for tracking land disturbances. One current method for tracking land disturbance activities throughout the life of a project is to mark areas of interests on a paper construction site plan. As depicted in FIG. 12, markings may include color coding, various symbols, and descriptions. In contrast to aspects described herein, a paper construction site plan with manual markings for tracking land disturbance activities throughout the life of a project facilitates imprecise record keeping and also fails to adequately identify statuses of disturbances at different stages (e.g., previous stages) of the project.

Figure 13:
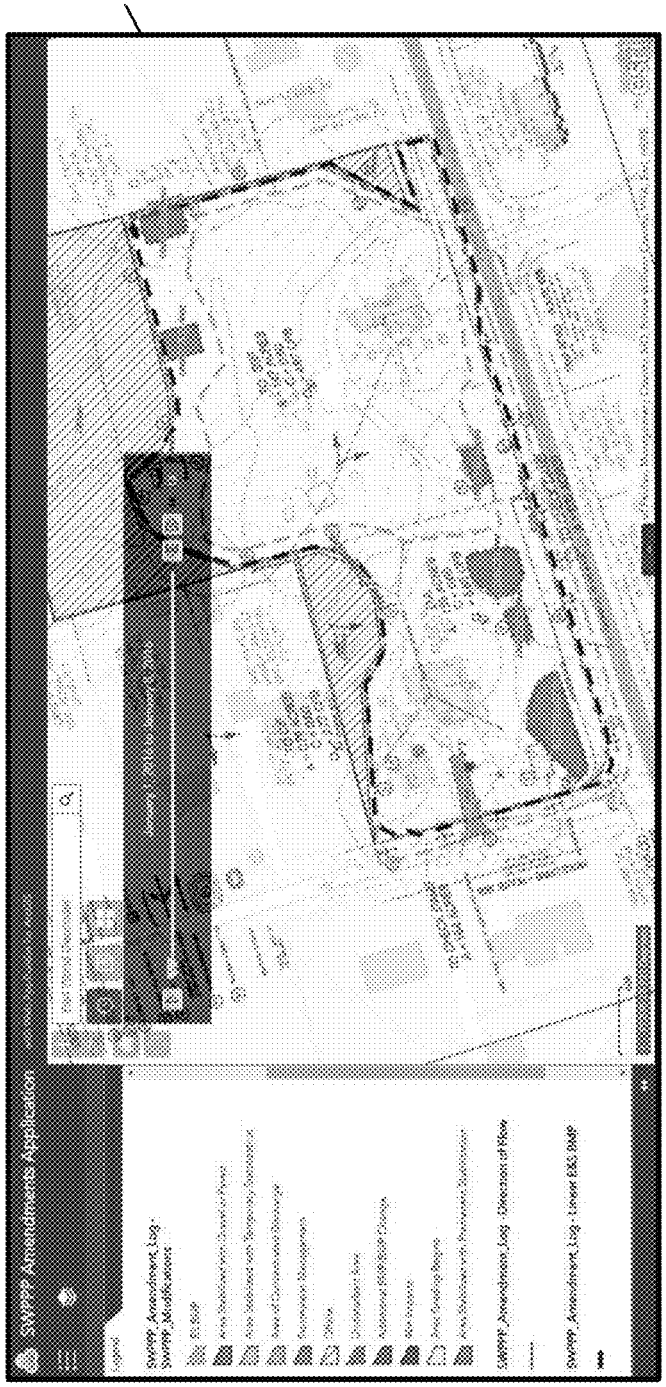
FIG. 13 is a diagram illustrating a UI element for depicting pollution source information and/or other data for a construction site at an early stage of a project's lifetime.

FIG. 13 is a diagram illustrating a UI element 1300 for depicting pollution source information and/or other data for a construction site at an early stage of a project's lifetime. UI element 1300 may be a part of a GUI associated with module(s) 104 and/or a GEOSWM web mapping application. In this example, UI element 1300 or user interface 110 may be usable for showing a pollution source or a corrective action point at an early stage in the life of a project using a time slider widget.

In some embodiments, a time slider widget in UI element 1300 may be usable to show activity at various points in time. For example, site activities may be viewable in weekly intervals by sliding a control element or interacting with a time slider widget. In another example, site activities may be viewable in daily intervals by sliding a control element or interacting with a time slider widget.

In some embodiments, UI element 1300 may display activities based on temporal data associated with features in a geodatabase. For example, status updates (e.g., changing values in a severity field) for corrective actions may be dated and stored. In this example, module(s) 104 or a related entity may determine corrective actions to display based on statuses of features during a time period selected using a time slider widget. In another example, a time slider widget may be dependent on availability of time related field data, e.g., "Installation Date" and "Removal Date", for features. In this example, the time slider widget may be inactive until at least one feature is defined in UI element 1300 or user interface 110 and dates are assigned to its time related fields.

It will be appreciated that FIG. 13 is for illustrative purposes and that additional and/or different UI elements and content than that depicted in FIG. 13 may be usable for aspects described herein.

Figure 14:
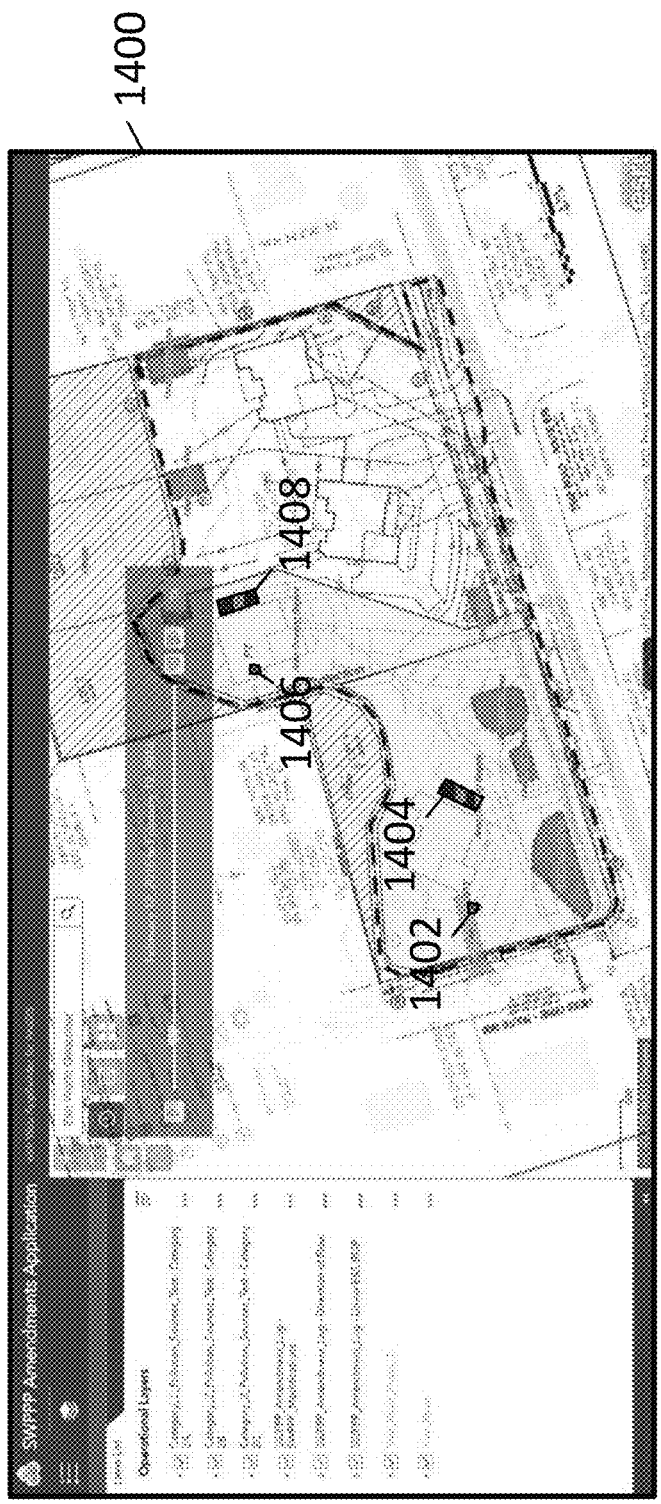
FIG. 14 is a diagram illustrating a UI element for depicting pollution source information and/or other data for a construction site at a midway stage of a project's lifetime.

FIG. 14 is a diagram illustrating a UI element 1400 for depicting pollution source information and/or other data for a construction site at a midway stage of a project's lifetime. UI element 1400 may be a part of a GUI associated with module(s) 104 and/or a GEOSWM web mapping application. In this example, UI element 1400 or user interface 110 may be usable for showing a pollution source or a corrective action point at a midway stage in the life of a project using a time slider widget.

In some embodiments, a time slider widget in UI element 1400 may be usable to show activity at various points in time. For example, site activities may be viewable in weekly intervals by sliding a control element or interacting with a time slider widget. In another example, site activities may be viewable in daily intervals by sliding a control element or interacting with a time slider widget.

In some embodiments, UI element 1400 may display activities based on temporal data associated with features in a geodatabase. For example, status updates (e.g., changing values in a severity field) for corrective actions may be dated and stored. In this example, module(s) 104 or a related entity may determine corrective actions to display based on statuses of features during a time period selected using a time slider widget. In another example, a time slider widget may be dependent on availability of time related field data, e.g., "Installation Date" and "Removal Date", for features. In this example, the time slider widget may be inactive until at least one feature is defined in UI element 1400 or user interface 110 and dates are assigned to its time related fields.

Referring to FIG. 14, pollution sources 1402-1408 represent features from a pollution source feature class and may be spatially represented as polygons. Each of pollution sources 1402-1408 may be associated with data fields or descriptive attributes, e.g., pollution source information, geographic data, temporal data, metadata, etc. For example, if a pollution source feature class is represented by a data table, each of pollution sources 1402-1408 may be represented as a row, where the columns of the data table represent fields or data attributes of the pollution source feature class.

It will be appreciated that FIG. 14 is for illustrative purposes and that additional and/or different UI elements and content than that depicted in FIG. 14 may be usable for aspects described herein.

Figure 15:
FIG. 15 is a diagram illustrating a UI element for depicting pollution source information and/or other data for a construction site at a completed stage of a project's lifetime.

FIG. 15 is a diagram illustrating a UI element 1500 for depicting pollution source information and/or other data for a construction site at a completed stage of a project's lifetime. UI element 1500 may be a part of a GUI associated with module(s) 104 and/or a GEOSWM web mapping application. In this example, UI element 1500 or user interface 110 may be usable for showing a pollution source or a corrective action point at a completed stage in the life of a project using a time slider widget.

In some embodiments, a time slider widget in UI element 1500 may be usable to show activity at various points in time. For example, site activities may be viewable in weekly intervals by sliding a control element or interacting with a time slider widget. In another example, site activities may be viewable in daily intervals by sliding a control element or interacting with a time slider widget.

In some embodiments, UI element 1500 may display activities based on temporal data associated with features in a geodatabase. For example, status updates (e.g., changing values in a severity field) for corrective actions may be dated and stored. In this example, module(s) 104 or a related entity may determine corrective actions to display based on statuses of features during a time period selected using a time slider widget. In another example, a time slider widget may be dependent on availability of time related field data, e.g., "Installation Date" and "Removal Date", for features. In this example, the time slider widget may be inactive until at least one feature is defined in UI element 1500 or user interface 110 and dates are assigned to its time related fields.

It will be appreciated that FIG. 15 is for illustrative purposes and that additional and/or different UI elements and content than that depicted in FIG. 15 may be usable for aspects described herein.

Figure 16:
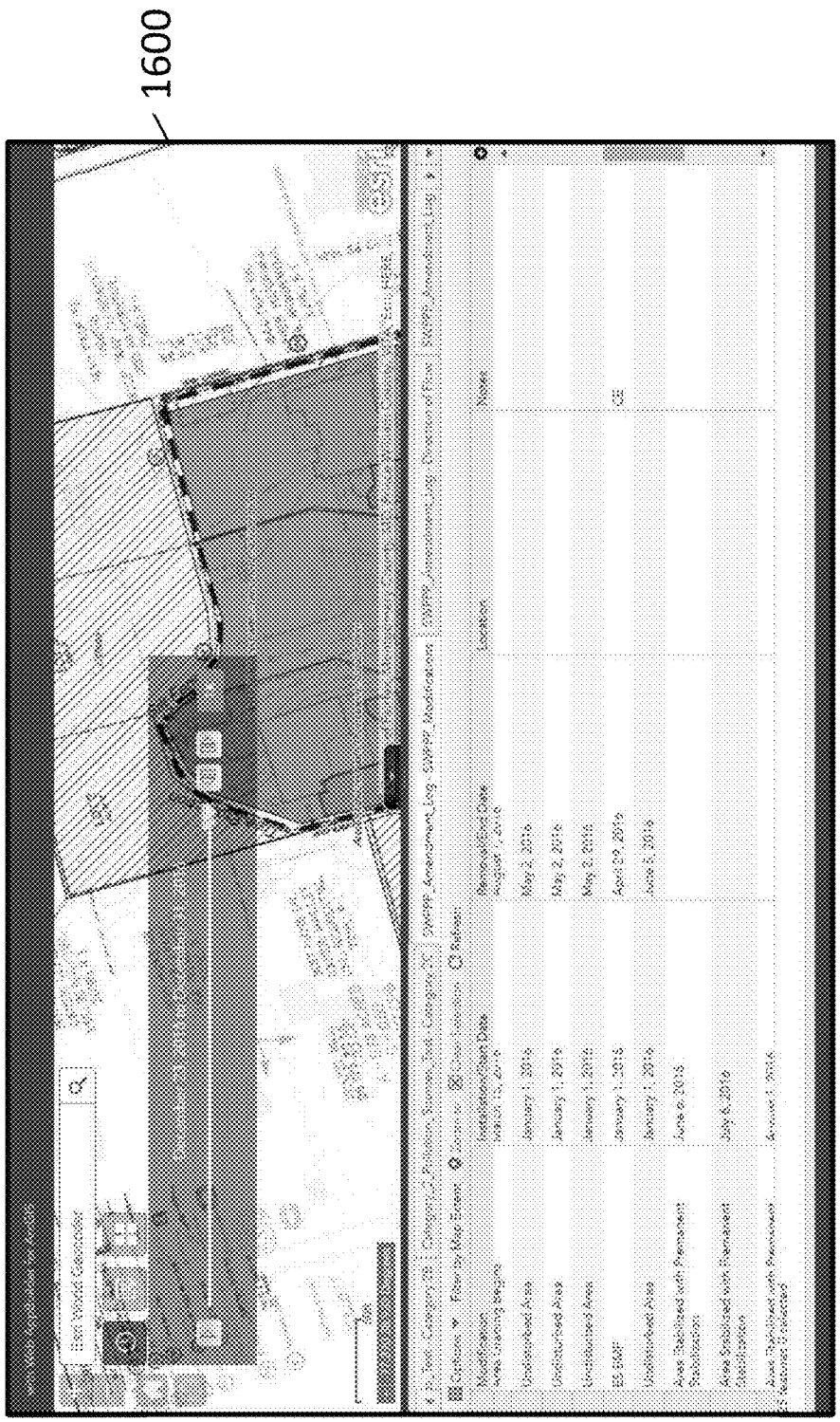
FIG. 16 is a diagram illustrating a UI element for displaying pollution source information and land disturbance data for a construction site.

FIG. 16 is a diagram illustrating a UI element 1600 for displaying pollution source information and land disturbance data for a construction site. UI element 1600 may be a part of a GUI associated with module(s) 104 and/or a GEOSWM web mapping application. In this example, UI element 1600 or user interface 110 may be usable for showing data associated with various activities at a particular stage in the life of a project.

In some embodiments, a UI container in UI element 1600 may be usable for showing logs, metadata, notes, or other data associated with one or more pollution sources, corrective actions, or other construction site activities during a particular time period, e.g., Dec. 23-Dec. 31, 2016.

It will be appreciated that FIG. 16 is for illustrative purposes and that additional and/or different UI elements and content than that depicted in FIG. 16 may be usable for aspects described herein.

Figure 17:
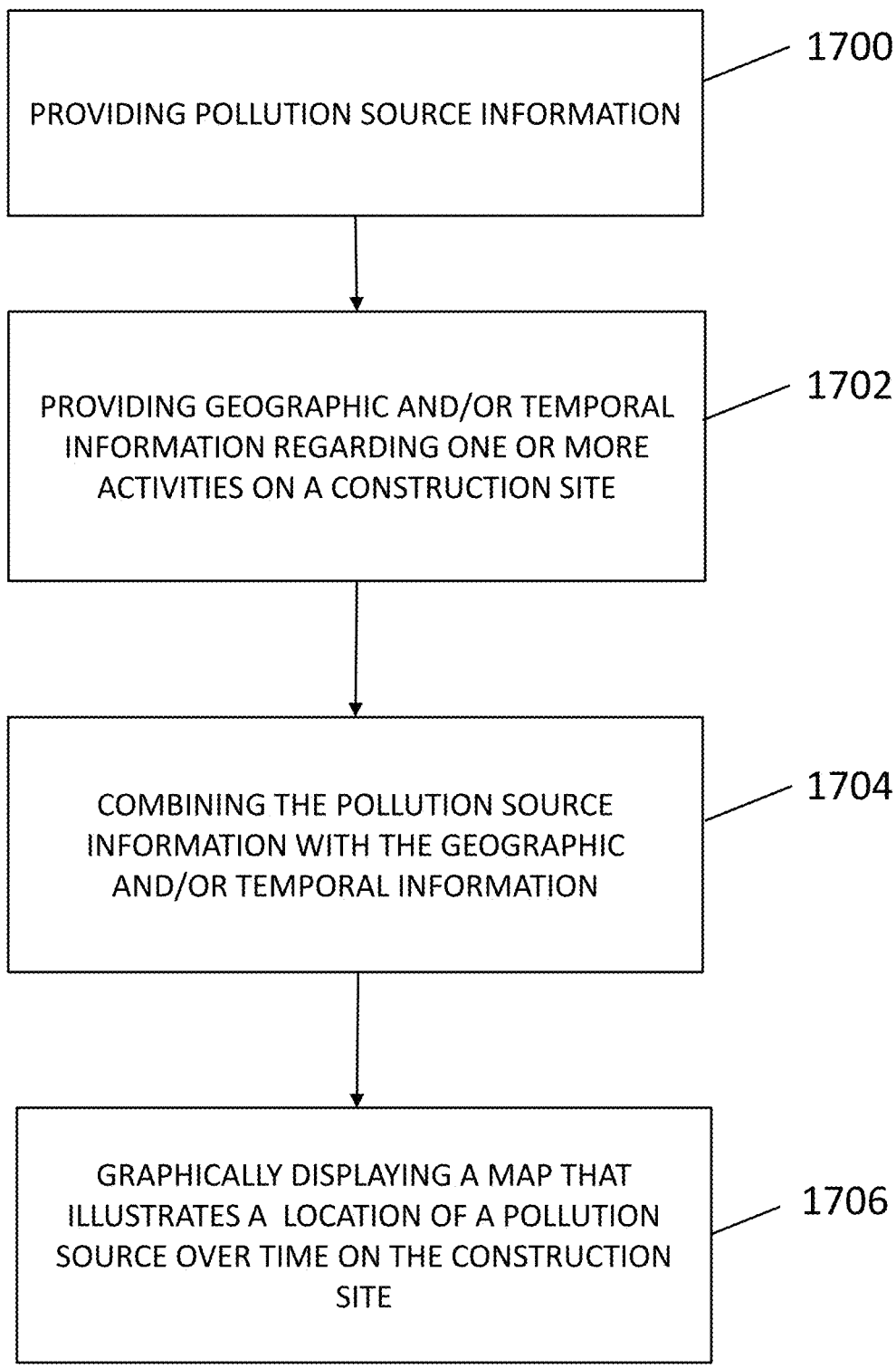
FIG. 17 is a flow chart illustrating an example process for providing pollution source information; providing geographic and/or temporal information regarding one or more activities on a construction site; and combining the pollution source information with the geographic and/or temporal information for the activities on the construction site.

FIG. 17 is a diagram illustrating an example process for providing pollution source information; providing geographic and/or temporal information regarding one or more activities on a construction site; and combining the pollution source information with the geographic and/or temporal information for the activities on the construction site. In some embodiments, the exemplary process described herein, or portions thereof, may be performed at or by computing platform 100, one or more modules 104, and/or another module or node. For example, computing platform 100 may be a mobile device or a computer, and module(s) 104 may include an application running or executing on the computing platform. In some embodiments, an exemplary process for providing pollution source information; providing geographic and/or temporal information regarding one or more activities on a construction site; and combining the pollution source information with the geographic and/or temporal information for the activities on the construction site may include steps 1700, 1702, 1704 and/or 1706.

Referring to FIG. 17, in step 1700, unique language is used to provide pollution source information, such as by describing pollution sources, corrective actions and/or site plan anatomy (all of which are encompassed in the term "pollution source information") in regard to Erosion and Sediment Control (ESC) and National Pollutant Discharge Elimination System (NPDES) compliance. To increase efficiency in the field, and to append this language to the spatial components of corrective actions in the field, geodatabases were constructed in ArcGIS 10.3 for Desktop to encompass this language with prepopulated drop downs. Here, the user can quickly decide what phrase best describes the deficiency at hand while satisfying specific language. Feature classes were created and further designed within each geodatabase. Three feature classes were then created within the geodatabase to accurately represent the geographic nature of each possible pollution source, i.e. point, line, and polygon (examples of items falling within the term "geographic information"). An example of a feature class within the described geodatabase is titled "Category 2—Pollution Sources". The geodatabase and the respective feature classes were then further designed to represent all relevant and specific language related to pollution sources and prevention. These feature classes were then published and consumed in the GEOSWM web map in the AGOL environment. Separate feature classes were defined to represent data in a point, line, or polygon format depending on the geographic nature of the pollution source and/or geographic information (see step 1702 of FIG. 17). Other approaches for providing geographic information regarding a geographic area of a construction site include providing a site plan, and obtaining at least one of global positioning system (GPS) coordinates, a longitude, a latitude, an altitude, a street address, and a relationship to a known fixed position.

In step 1706, in some embodiments, once designed and defined through the Service Editor, these feature classes are then published as feature services and consumed by the GEOSWM Web Map and Web Mapping Application. Once the feature classes were consumed in the GEOSWM web map they were given design criteria such as feature symbology, visibility ranges, transparencies, and attribute configuration that are carried over to the GEOSWM web mapping application.

In steps 1702 and 1704, in some embodiments, provided in this feature service is the ability to enable time in the layer. The option to enable time on a feature service is available if the service contains a time component. Category 2—Pollution Sources, actually contains three time components (all of which are encompassed in the term "temporal information". The operational time components in the Category 2 layer include "Installation Date" and "Removal Date". Once the feature is drawn on the map in the GEOSWM application and dates are assigned to these to fields, the Time Slider tool or widget is activated. The Time Slider is an additional widget incorporated into the GEOSWM application during the design phase in the WAB editing environment. The Time Slider widget was further designed to represent Category 2 data in 365 equal intervals over a one year period in order to track potential pollution sources on a daily basis.

Now leaving the ArcGIS for Desktop 10.3 environment and moving to ESRI's Web Based mapping environment, AGOL, the services previously created are now consumed in this platform and the base design of the GEOSWM web mapping application begins.

Thus, referring again to FIG. 1 and also continuing with FIG. 17, in steps 1702, 1704, and 1706, in some embodiments, combining the pollution source information with the geographic information comprises providing the location of a pollution source over time. In some embodiments, a map is graphically displaying on user interface 110, wherein the map illustrates a geographic location of a pollution source on the construction site over time. Further, in some embodiments, combining the pollution source information with the geographic information and/or temporal information comprises displaying a pollution source location on a map and tracking the pollution source location on a predetermined time interval, such as but not limited to, on a daily basis. In some embodiments, displaying a map that illustrates the geographic location of the pollution source over time includes displaying one of a topological map, a topographical map, a 2-dimensional map, a 3-dimensional map, a street map, a satellite map, or a combination thereof.

The AGOL environment also supports the content of the final web mapping application. Services and layers are brought into and removed from the final web mapping application through the AGOL web map platform only. The AGOL environment serves as the administrative realm for the user end application.

Once the content of the web map is complete and design criteria are met, the web map can then be published in AGOL using any number of predesigned templates or employing Web App Builder (WAB) depending on the users' and applications' needs and goals.

AGOL offers many pre-designed templates to use to publish web mapping applications. WAB was chosen because of its versatility.

Within the WAB editing environment, several tools known as widgets were further incorporated into the final design of the GEOSWM application. Some of these widgets include base map gallery, print tool, measure, draw, and edit.

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims.

Unless otherwise indicated, all numbers expressing measurements, conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a length, width, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for combining pollution source information with geographical and temporal information for a land-disturbing construction site, the method comprising:
   providing pollution source information comprising a feature class storing data relating to a pollution source, the feature class selected from at least three feature classes for representing geographic natures of different pollution sources, wherein the at least three feature classes are used in determining whether a pollution source will be spatially represented as a point, a line, or a polygon;
   providing geographic and temporal information regarding one or more activities on a construction site, wherein providing the geographic information comprises providing locations of one or more corrective actions associated with the pollution source information, wherein providing temporal information comprises providing an installation date, status updates, and a removal date of the one or more corrective actions;
   combining the pollution source information with the geographic information and temporal information into an interactive map, wherein combining the pollution source information with the geographic information comprises:
      georeferencing a site plan for the construction site, wherein the site plan is a digitalized version of a paper site plan including physical or geographical features associated with the construction site, wherein georeferencing the site plan comprises selecting at least two location discernible points on the site plan associated with one or more of the physical or geographical features, overlaying the site plan on a real world base map comprising satellite imagery, and aligning the site plan and the real world base map by matching the at least two location discernible points on the site plan and corresponding points on the real world base map, and spatially representing the pollution source of the feature class on the georeferenced site plan according to the pollution source information; and
   displaying, on a display device associated with a computer, the interactive map, wherein the interactive map is configured to display corrective actions related to a location on the interactive map when the location is selected, wherein the interactive map includes a time slider widget for displaying the corrective actions based on statuses of the corrective actions during time periods selected using the time slider widget.

2. The method of claim 1, wherein providing pollution source information comprises providing a database, optionally wherein the database provides a prepopulated drop down menu with one or more predetermined description(s) of the pollution source information.

3. The method of claim 1, wherein providing geographic information includes providing at least one of global positioning system (GPS) coordinates, a longitude, a latitude, an altitude, a street address, and a relationship to a known fixed position.

4. The method of claim 1, wherein combining the pollution source information with the geographic information comprises providing a location of a pollution source over time.

5. The method of claim 1, further comprising graphically displaying, on the display device, a map that illustrates a geographic location on the construction site of a pollution source over time.

6. The method of claim 5, wherein displaying a map that illustrates the geographic location of the pollution source over time includes displaying one of a topological map, a topographical map, a 2-dimensional map, a 3-dimensional map, a street map, a satellite map, or a combination thereof.

7. The method of claim 1, wherein combining the pollution source information with the geographic information and temporal information comprises displaying a pollution source location on a map and tracking the pollution source location on a predetermined time interval.

8. A system for combining pollution source information with geographical and temporal information for a land-disturbing construction site, the system comprising:
   a computing platform comprising:
      at least one processor;
      at least one memory;
      a compliance management module implemented using the at least one processor and the at least one memory, wherein the compliance management module is configured for:
      providing pollution source information comprising a feature class storing data relating to a pollution source, the feature class selected from at least three feature classes for representing geographic natures of different pollution sources, wherein the at least three feature classes are used in determining whether a pollution source will be spatially represented as a point, a line, or a polygon;
      providing geographic and temporal information regarding one or more activities on a construction site, wherein providing the geographic information comprises providing locations of one or more corrective actions associated with the pollution source information, wherein providing temporal information comprises providing an installation date, status updates, and a removal date of the one or more corrective actions;
      combining the pollution source information with the geographic information and temporal information into an interactive map, wherein combining the pollution source information with the geographic information comprises:
         georeferencing a site plan for the construction site, wherein the site plan is a digitalized version of a paper site plan including physical or geographical features associated with the construction site, wherein georeferencing the site plan comprises selecting at least two location discernible points on the site plan associated with one or more of the physical or geographical features, overlaying the site plan on a real world base map comprising satellite imagery, and aligning the site plan and the real world base map by matching the at least two location discernible points on the site plan and corresponding points on the real world base map, and spatially representing the pollution source of the feature class on the georeferenced site plan according to the pollution source information; and
      displaying, on a display device associated with a computer, the interactive map, wherein the interactive map is configured to display corrective actions related to a location on the interactive map when the location is selected, wherein the interactive map includes a time slider widget for displaying the corrective actions based on statuses of the corrective actions during time periods selected using the time slider widget.

9. The system of claim 8, wherein providing pollution source information comprises providing a database, optionally wherein the database provides a prepopulated drop down menu with one or more predetermined description(s) of the pollution source information.

10. The system of claim 8, wherein the module for providing geographic information is configured for obtaining at least one of global positioning system (GPS) coordinates, a longitude, a latitude, an altitude, a street address, and a relationship to a known fixed position.

11. The system of claim 8, wherein the data combining and mapping module is configured for providing a location of a pollution source over time.

12. The system of claim 8, wherein the data combining and mapping module is configured for displaying a pollution source location on a map and tracking the pollution source location on a predetermined time interval.

13. The system of claim 8, wherein the data combining and mapping module is configured to generate one of a topological map, a topographical map, a 2 dimensional map, a 3-dimensional map, a street map, a satellite map, or a combination thereof.

14. The system of claim 8, wherein the data combining and mapping module is configured to generate a geographic location on the construction site of a pollution source over time.

15. The system of claim 8, wherein the display device is configured for graphically displaying a map, optionally wherein the map illustrates a geographic location on the construction site of a pollution source over time.

16. The system of claim 15, wherein the display device displays one of a topological map, a topographical map, a 2-dimensional map, a 3-dimensional map, a street map, a satellite map, or a combination thereof.

17. A non-transitory computer readable medium having stored thereon executable instructions that when executed by at least one processor of a computer cause the computer to perform steps comprising:
   providing pollution source information comprising a feature class storing data relating to a pollution source, the feature class selected from at least three feature classes for representing geographic natures of different pollution sources, wherein the at least three feature classes are used in determining whether a pollution source will be spatially represented as a point, a line, or a polygon;

providing geographic and temporal information regarding one or more activities on a construction site, wherein providing the geographic information comprises providing locations of one or more corrective actions associated with the pollution source information, wherein providing temporal information comprises providing an installation date, status updates, and a removal date of the one or more corrective actions;

combining the pollution source information with the geographic information and temporal information into an interactive map, wherein combining the pollution source information with the geographic information comprises:

georeferencing a site plan for the construction site, wherein the site plan is a digitalized version of a paper site plan including physical or geographical features associated with the construction site, wherein georeferencing the site plan comprises selecting at least two location discernible points on the site plan associated with one or more of the physical or geographical features, overlaying the site plan on a real world base map comprising satellite imagery, and aligning the site plan and the real world base map by matching the at least two location discernible points on the site plan and corresponding points on the real world base map, and spatially representing the pollution source of the feature class on the georeferenced site plan according to the pollution source information; and displaying, on a display device associated with a computer, the interactive map, wherein the interactive map is configured to display corrective actions related to a location on the interactive map when the location is selected, wherein the interactive map includes a time slider widget for displaying the corrective actions based on statuses of the corrective action during time periods selected using the time slider widget.

* * * * *